United States Patent
Park et al.

(10) Patent No.: US 7,453,455 B2
(45) Date of Patent: Nov. 18, 2008

(54) IMAGE-BASED RENDERING AND EDITING METHOD AND APPARATUS

(75) Inventors: In-kyu Park, Seoul (KR); Joo-yeon Han, Gyeonggi-do (KR); Mahn-jin Han, Gyeonggi-do (KR); Alexey Victorovich Ignatenko, Moscow (RU); Anton Konouchine, Moscow (RU); Leonid Ivanovich Levkovich-Maslyuk, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 742 days.

(21) Appl. No.: 10/890,280

(22) Filed: Jul. 14, 2004

(65) Prior Publication Data

US 2005/0012757 A1    Jan. 20, 2005

(30) Foreign Application Priority Data

Jul. 14, 2003    (KR) .................... 10-2003-0048110

(51) Int. Cl.
*G06T 15/00*    (2006.01)
(52) U.S. Cl. ............... 345/419; 345/420; 345/427; 345/581; 345/582; 345/648; 345/670
(58) Field of Classification Search ................ 345/419, 345/581, 582, 420, 427, 648, 670
See application file for complete search history.

(56) References Cited

U.S. PATENT DOCUMENTS 6,677,957 B2 * 1/2004 Grzeszczuk et al. ......... 345/582

OTHER PUBLICATIONS

Kari Pulli et al., "View-based Rendering: Visualizing Real Objects from Scanned Range and Color Data," Rendering Techniques '97, Proceedings of the Eurographics Workshop. St. Etienne, Jun. 16-18, 1997; vol. Workshop 8, pp. 23-34, XP000776802, ISBN: 3-211-83001-4.

Yanci Zhang et al., "A Hybrid Representation of Environment Models in Image-Based Real Time Walkthrough," Computer Graphics and Applications, 2002. Proceedings, 10th Pacific Conference on Beijing, China, Oct. 9-11, 2002, IEEE Computer Society, Oct. 9, 2002, pp. 335-344, XP010624917, ISBN: 0-7695-1784-6.

Chih-Chun Chen et al., "Rendering complex scenes based on spatial subdivision, object-based depth mesh, and occlusion culling," Proceedings of the SPIE-Int. Soc. Opt. Eng, USA, vol. 4756, Apr. 9, 2002, pp. 45-54, XP002350898, ISSN: 0277-786X.

(Continued)

*Primary Examiner*—Kimbinh T Nguyen
(74) *Attorney, Agent, or Firm*—Staas & Halsey LLP

(57) ABSTRACT

A method and apparatus removing redundant data of a simple texture model, using an extended depth image, and an image-based editing method and apparatus. The method involves calculating normal vectors of pixels projected into a three-dimensional (3D) space by using depth images among a plurality of simple texture images, the plurality of simple texture images rendering different aspects of a 3D model; calculating reliabilities of the pixels of each of the simple texture images by using the calculated normal vectors; and comparing the reliabilities of the pixels that originate from different simple texture images but render the same portion of the 3D model and removing the pixels having low reliabilities from the different simple texture images from which they respectively originate.

27 Claims, 15 Drawing Sheets

OTHER PUBLICATIONS

Paul Debevec et al., "Efficient view-dependent image-based rendering with projective texture-mapping," Rendering and Techniques, Proceedings of the Eurographics Workshop, Jun. 29, 1998, pp. 105-116, 329, XP002265320.

Ramesh Raskar et al., "Blending Multiple Views", Computer Graphics and Applications, Proceedings. 10th Pacific Conference on Beijing, China, Oct. 9-11, 2002, IEEE Comput. Soc., Oct. 9, 2002, pp. 145-153, XP010624898, ISBN: 0-7695-1784-6.

* cited by examiner

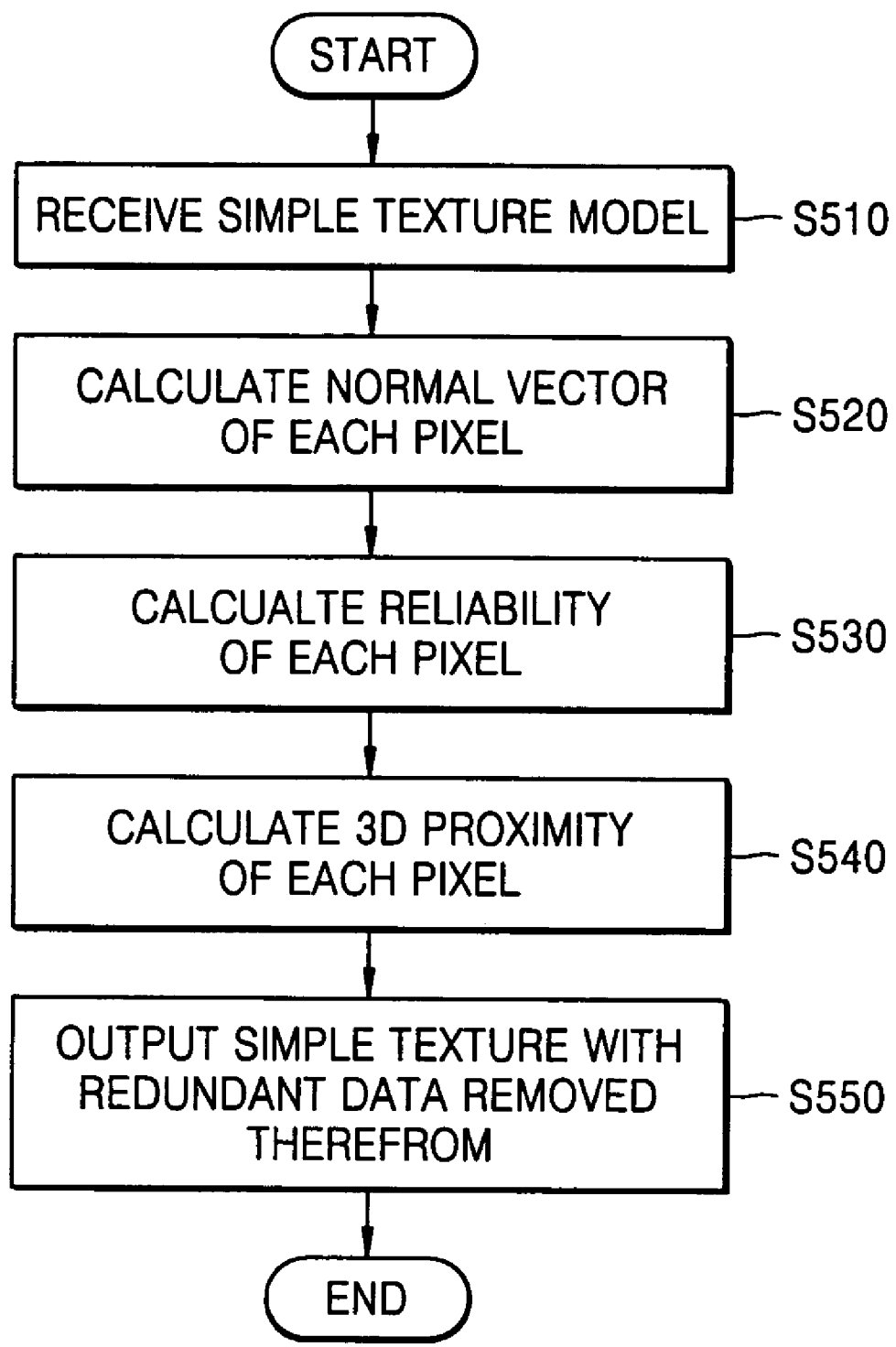

(a)          (b)          (c)          (d)

(a)

(b)                                    (c)

IMAGE-BASED RENDERING AND EDITING METHOD AND APPARATUS

CROSS-REFERENCE TO RELATED APPLICATION

This application claims the priority of Korean Patent Application No. 2003-48110, filed on Jul. 14, 2003, in the Korean Intellectual Property Office, the disclosure of which is incorporated herein by reference.

BACKGROUND OF THE INVENTION

1. Field of the Invention

The present invention relates to methods and apparatuses for generating and editing a three-dimensional (3D) model, and more particularly, to methods and apparatuses for generating and editing a 3D model, which can more precisely generate a 3D model and can more quickly edit the 3D model using depth information of the 3D model.

2. Description of the Related Art

Since the first research into 3D graphics, one of the most fundamental goals of 3D graphics has always been to generate 3D models more precisely and more quickly. Recent multimedia applications require user devices, such as mobile devices, to more quickly and more precisely generate 3D models in a network environment. However, a conventional mesh-based generating technique using a polygonal mesh has failed to meet this requirement satisfactorily. For example, in the case of generating a complicated 3D model on a small screen of a terminal device using the conventional mesh-based generating technique, some information on links between vertices may be redundant. Complex meshes must be simplified in order to enable interactive 3D model renderings. In order to simplify such complex meshes, however, complex algorithms are necessary. In addition, complex algorithms are also needed to compress meshes and transmit the compressed meshes progressively.

A conventional image-based rendering technique, which is an alternative to the conventional mesh-based rendering technique, can render image-based or point-based 3D models with high resolution by using images having depth information, i.e., depth images. The image-based rendering technique can also appropriately process or edit image data and can render 3D models in real time.

The conventional image-based rendering technique, however, renders the 3D model without considering the fact that reference images of the 3D model may include redundant data of the simple texture model that render the same portion of the 3D model from different viewpoints, thereby considerably degrading the rendering speed and quality.

In addition, the conventional image-based rendering technique cannot satisfactorily render various surface characteristics of a 3D model, such as glitter or shade varying from viewpoint to viewpoint. Therefore, a 3D model rendered by the conventional image-based rendering technique may not be realistic. Moreover, the conventional mesh-based rendering technique needs complex algorithms because it provides no other option but to modify every reference image of an image-based 3D model in order to modify the image-based 3D model, in which case, the amount of image data needed to be edited is considerable.

SUMMARY OF THE INVENTION

According to an aspect of the present invention, there is provided a method and apparatus for removing redundant data of a simple texture model that render the same portion of a 3D model from different viewpoints, which can improve rendering speed and quality.

According to another aspect of the present invention, there is provided a rendering method and apparatus, which can successfully render surface characteristics of a 3D model, such as glitter and shade, which vary from viewpoint to viewpoint.

According to an aspect of the present invention, there is also provided an image-based editing method and apparatus for editing a 3D model rendered using an image-based rendering method.

According to an aspect of the present invention, there is provided a method of removing redundant data of a simple texture model. The method involves calculating normal vectors of pixels projected into a three-dimensional (3D) space by using depth images among a plurality of simple texture images, the plurality of simple texture images rendering different aspects of a 3D model; calculating reliabilities of the pixels of each of the simple texture images by using the calculated normal vectors; and comparing the reliabilities of the pixels that originate from different simple texture images but render the same portion of the 3D model and removing the pixels having low reliabilities from the different simple texture images from which they respectively originate.

In the calculation of the normal vectors of the pixels, the normal vectors of the pixels of each of the simple texture images may be calculated by projecting the pixels of each of the simple texture images onto the 3D space based on values of the pixels of each of the depth images and calculating normal vectors of triangular planes which are respectively formed using the pixels projected onto the 3D space and their respective two adjacent pixels.

The calculation of the normal vectors of the pixels may involve projecting the pixels of each of the simple texture images onto the 3D space based on the values of the pixels of each of the depth images and detecting the pixels adjacent to each of the pixels projected onto the 3D space; forming triangular planes using the pixels projected onto the 3D space and the two adjacent pixels and calculating normal vectors of the triangular planes; and averaging the normal vectors of the triangular planes.

In the calculation of the reliabilities of the pixels, the reliabilities of the pixels of each of the simple texture images may be calculated using the normal vectors of the pixels of each of the simple texture images and a vector perpendicular to a plane of vision of a camera used for creating the simple texture images.

In the calculation of the reliabilities of the pixels, the reliabilities of the pixels of each of the simple texture images may be determined depending on inner projects of the normal vectors of the pixels of each of the simple texture images and a vector perpendicular to a plane of vision of a camera used for creating the simple texture images.

The calculation of the reliabilities of the pixels may involve calculating proximities of the pixels of each of the simple textures to one another in the 3D space and determining the pixels located a predetermined critical distance or less apart from one another as rendering the same portion of the 3D model.

In the comparison of the reliabilities of the pixels, all pixels rendering the same portion of the 3D model but originating from different simple texture images, except for the one having the highest reliability, may be removed from the different simple texture images from which all the pixels respectively originate.

In the comparison of the reliabilities of the pixels, pixels of each of the depth images having low reliabilities may be set as pixels of a background image.

According to another aspect of the present invention, there is provided an apparatus removing redundant data of a simple texture model. The apparatus includes a normal vector calculating unit, which calculates normal vectors of pixels projected onto a three-dimensional (3D) space by using depth images among a plurality of simple texture images that render different aspects of a 3D model; a reliability calculating unit, which calculates reliabilities of the pixels of each of the simple texture images by using the normal vectors obtained by the normal vector calculating unit; and a redundant data removing unit, which compares the reliabilities of the pixels originating from different simple texture images but rendering the same portion of the 3D model and removes the pixels having low reliabilities from the different simple texture images from which they respectively originate.

According to another aspect of the present invention, there is provided a rendering method. The rendering method involves receiving simple texture images rendering different aspects of a 3D model and attribute information of the 3D model and generating an extended depth image, which is a two-dimensional (2D) image representing a color and depth of the 3D model that vary from view point to view point and attributes of the 3D model, using the simple texture images and the attribute information; setting coefficients of a predetermined reflectance model for each pixel of the extended depth image based on the attribute information of the 3D model; calculating normal vectors of pixels of each depth image included in the extended depth image; and determining the color of the 3D model, which varies depending on the attributes of the 3D model by using the predetermined reflectance model coefficient and the normal vectors, and rendering the 3D model using the determined color.

The attribute information may include a specular component which indicates the degree to which the 3D model reflects light and varies depending on a view point, and a shininess component which indicates the degree to which the 3D model shines and varies depending on the texture of the surface of the 3D model.

The predetermined reflectance model may be a Phong reflectance model.

In the calculation of the normal vectors, the normal vectors of the pixels of each of the simple texture images may be calculated by projecting the pixels of each of the simple texture images onto the 3D space based on values of pixels of each of the depth images and calculating normal vectors of triangular planes which are respectively formed using the pixels projected onto the 3D space and their respective two adjacent pixels.

The calculation of the normal vectors may include projecting the pixels of each of the simple texture images onto the 3D space based on the values of the pixels of each of the depth images and detecting pixels adjacent to each of the pixels projected onto the 3D space; forming triangular planes using the pixels projected onto the 3D space and their respective two adjacent pixels and calculating normal vectors of the triangular planes; and averaging the normal vectors of the triangular planes.

According to another aspect of the present invention, there is provided a rendering apparatus. The rendering apparatus includes an extended depth image forming unit, which receives simple texture images that render different aspects of a 3D model and attribute information of the 3D model and generates an extended depth image, which is a two-dimensional (2D) image representing a color and depth of the 3D model that vary from view point to view point and attributes of the 3D model, using the simple texture images and the attribute information; a reflectance model coefficient setting unit, which sets coefficients of a predetermined reflectance model for each pixel of the extended depth image based on the attribute information of the 3D model; a normal vector determining unit, which calculates normal vectors of pixels of each depth image included in the extended depth image; and a rendering unit, which determines the color of the 3D model, which varies depending on the attributes of the 3D model, by using the predetermined reflectance model coefficient and the normal vectors and renders the 3D model using the determined color.

According to another aspect of the present invention, there is provided an image-based editing method. The image-based editing method may include capturing an image rendering a 3D model using a plurality of simple texture images, including color images and depth images, each of the simple texture images rendering a different aspect of the 3D model; editing pixels of the captured image and storing the edited image; and updating reference images (the color and depth images of the plurality of simple texture images) using the edited image.

The updating of the reference images may involve selecting one of the reference images and a portion thereof to be edited using the edited image; selecting pixels of the selected reference image corresponding to the edited pixels of the edited image and editing the selected pixels of the selected reference image based on the edited image; and storing the edited reference image.

In the updating of the reference images, pixels of each of the reference images rendering the same portion as the edited pixels of the edited reference image may be all edited based on the edited reference image.

The editing of the pixels of the captured image may involve selecting a portion of the 3D model rendered in the captured image and calculating a normal vector of the selected portion; setting a light source having attributes set by a user at an infinitely distant point in a direction of the normal vector calculated in the calculation of the normal vector of the selected portion; calculating normal vectors of pixels of the captured image; calculating a color of the 3D model based on the attributes of the light source and the normal vectors calculated of the pixels of the captured image; and creating the edited reference image using the calculated color.

In the calculation of the color of the 3D model, the color of the 3D model may be calculated using coefficients of a Phong reflectance model.

The editing of the pixels of the captured image may involve selecting one of the reference images and a portion thereof to be edited; removing the selected portion from the selected reference image by setting values of pixels corresponding to the selected portion of the selected reference image to a predetermined value; and storing the resultant reference image as the edited reference image.

According to another aspect of the present invention, there is provided an image-based editing apparatus. The image-based editing apparatus includes an image capturing unit, which captures an image rendering a 3D model using a plurality of simple texture images which includes color and depth images rendering different aspects of the 3D model; an image editing unit, which edits pixels of the captured image and stores the edited reference image; and a back-projecting unit, which updates reference images using the edited reference image, the reference images being the color and depth images of the plurality of simple texture images.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings in which:

FIGS. 5A and 5B are flowcharts of a method of removing redundant data of a simple texture model according to an embodiment of the present invention;

DETAILED DESCRIPTION OF THE EMBODIMENTS

Figure 1:
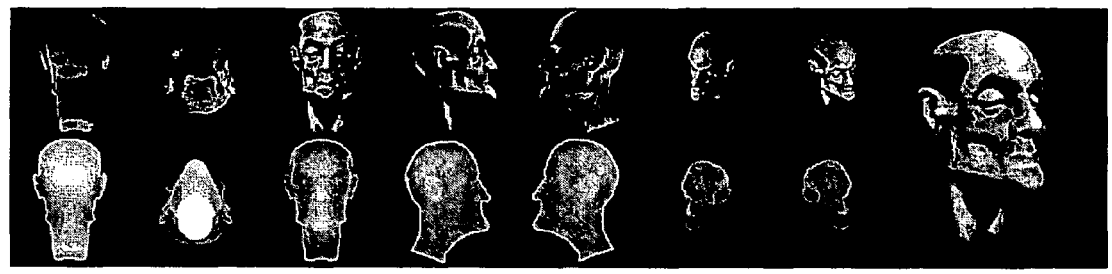
FIG. 1 is a diagram illustrating a simple texture model.

Reference will now be made in detail to the embodiments of the present invention, examples of which are illustrated in the accompanying drawings, wherein like reference numerals refer to the like elements throughout. The embodiments are described below to explain the present invention by referring to the figures.

In the present invention, a three-dimensional (3D) model is generated using a simple texture model. The simple texture model includes reference images, which render different aspects of the 3D model. Each of the reference images contains geometrical information (i.e., depth information), information on a camera, such as the location, direction, and field-of-view of the camera, and information on near and far clipping planes.

FIG. 1 illustrates one example of the simple texture model. More specifically, color images of a simple texture model are illustrated in the upper half of FIG. 1, depth images of the simple texture model are illustrated in the lower half of FIG. 1, and a 3D model rendered using the simple texture model is illustrated in the far right of FIG. 1. When using an orthographic camera, the width and height of vision of the orthographic camera is stored. Pixels of each of the depth images, which are represented in gray scale, project different portions of the surface of the 3D model. Values of the pixels of each of the depth images are determined based on distances between a predetermined camera and portions of the surface of the 3D model that they respectively project. Referring to FIG. 1, portions of the 3D model close to the predetermined camera are rendered brighter in each of the depth images than portions of the 3D model distant from the predetermined camera.

The reference images can be stored using a method such as a wavelet compression method, so that the compressed reference images can be progressively transmitted over a network. Preferably, the color images and the depth images have the same dimensions. Each of the depth images can be selectively encoded into an alpha channel of a color image using eight or sixteen bits per pixel. However, 8 bits are insufficient to precisely render the 3D model with high resolution. Each of the depth images renders an aspect of the 3D model, and together they render every aspect of the 3D model.

Figure 2:
FIG. 2 is a diagram illustrating a model of a gate and camera locations at which reference images of the gate are captured.
Figure 3:
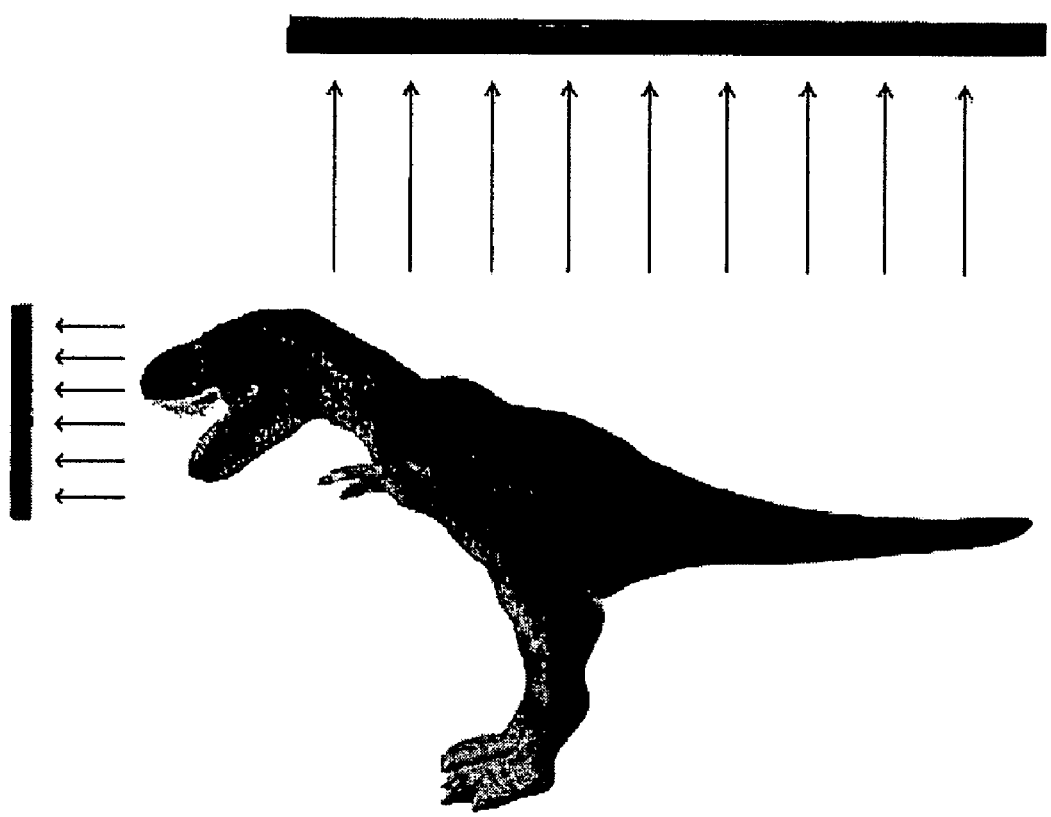
FIG. 3 is a diagram illustrating resolution variations depending on the location of a camera.

FIG. 2 illustrates a model of a gate and camera locations at which images of the gate are captured. Referring to FIG. 2, no restrictions are imposed on the size of each of the reference images and the location and direction of each camera. High-resolution maps are prepared for portions of the surface of a 3D model that need to be rendered more delicately. As shown in FIG. 3, cameras capturing images of the head of a dinosaur create a more refined simple texture model than cameras capturing images of the back of the dinosaur.

According to the present invention, a static version of 3D model rendering can be obtained by rendering 3D distance data or a synthetic object off line and, if necessary, optimising the result of the off-line rendering.

The present invention adopts an animated image-based rendering technique using color streams and depth streams. An animated object image is a set of color streams and depth streams. Here, the color streams are synchronized with their respective depth streams. The animated image-based rendering technique may be very useful for applications such as 3D movies. The animated image-based rendering technique does not impose any restrictions on the type of animation. In addition, the animated image-based rendering technique, which is a complexity-independent rendering technique, can make large image data small by compressing the image data using a MPEG-4 video compression method. In this regard, the animated image-based rendering technique is more efficient than a conventional key frame animation technique, especially when applied to complicated models.

A method and apparatus removing redundant data of a simple texture model according to embodiments of the invention will now be described more fully with reference to the accompanying drawings.

A simple texture model has reference images, including color information and depth information. Each of the reference images also includes information on distances between portions of a 3D model and a predetermined point of view. Different reference images in the simple texture model may render the same portions of the 3D model, in which case, the simple texture model has redundant data. Samples, originating from different depth images but rendering the same portion of the 3D model, are projected onto almost the same spot in a 3D space. Such redundant samples cause the following problems.

First, the redundant samples undesirably increase the size of the simple texture model and thus adversely affect rendering speed.

Second, a portion of the surface of the 3D model may be rendered in different output images with different numbers of pixels, i.e., the portion of the surface of the 3D model may be captured in different depth maps with different sampling rates. In this case, samples with low sampling rates are rendered larger in each of the output images than samples with high sampling rates. Therefore, reliable pixels, i.e., the samples with high sampling rates, may be replaced by less reliable pixels, i.e., the samples with low sampling rates, which results in degraded rendering quality.

Third, in principle, samples that render the same portion of the surface of the 3D model are expected to have the same color or at least similar colors, even though they originate from different depth maps. However, due to redundant data in the simple texture model, these samples may have different colors, which results in rendering noise.

The present invention can solve the above-described problems by minimizing the number of samples that render the same portion of the surface of the 3D model but are recovered from different depth maps. In the present invention, if more than one sample render the same portion of the surface of the 3D model, they are considered redundant.

Figure 4:
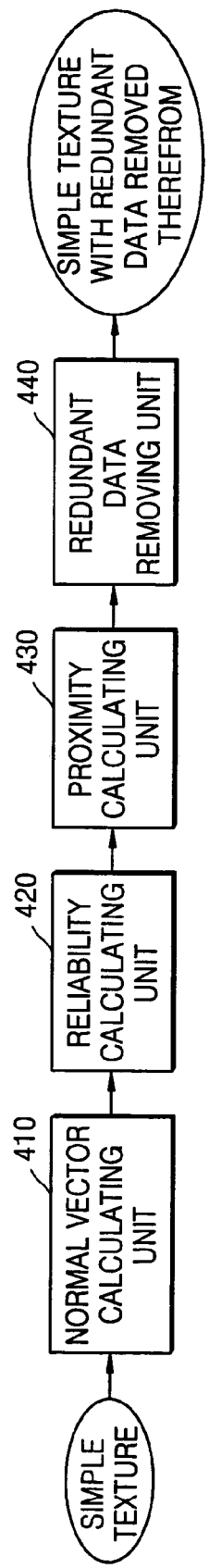
FIG. 4 is a block diagram of an apparatus for removing redundant data of a simple texture model according to an embodiment of the present invention.

FIG. 4 is a block diagram of an apparatus removing redundant data of a simple texture model according to an embodiment of the present invention. Referring to FIG. 4, the apparatus includes a normal vector calculating unit 410, a reliability calculating unit 420, a proximity calculating unit 430, and a redundant data removing unit 440.

Figure 5B:
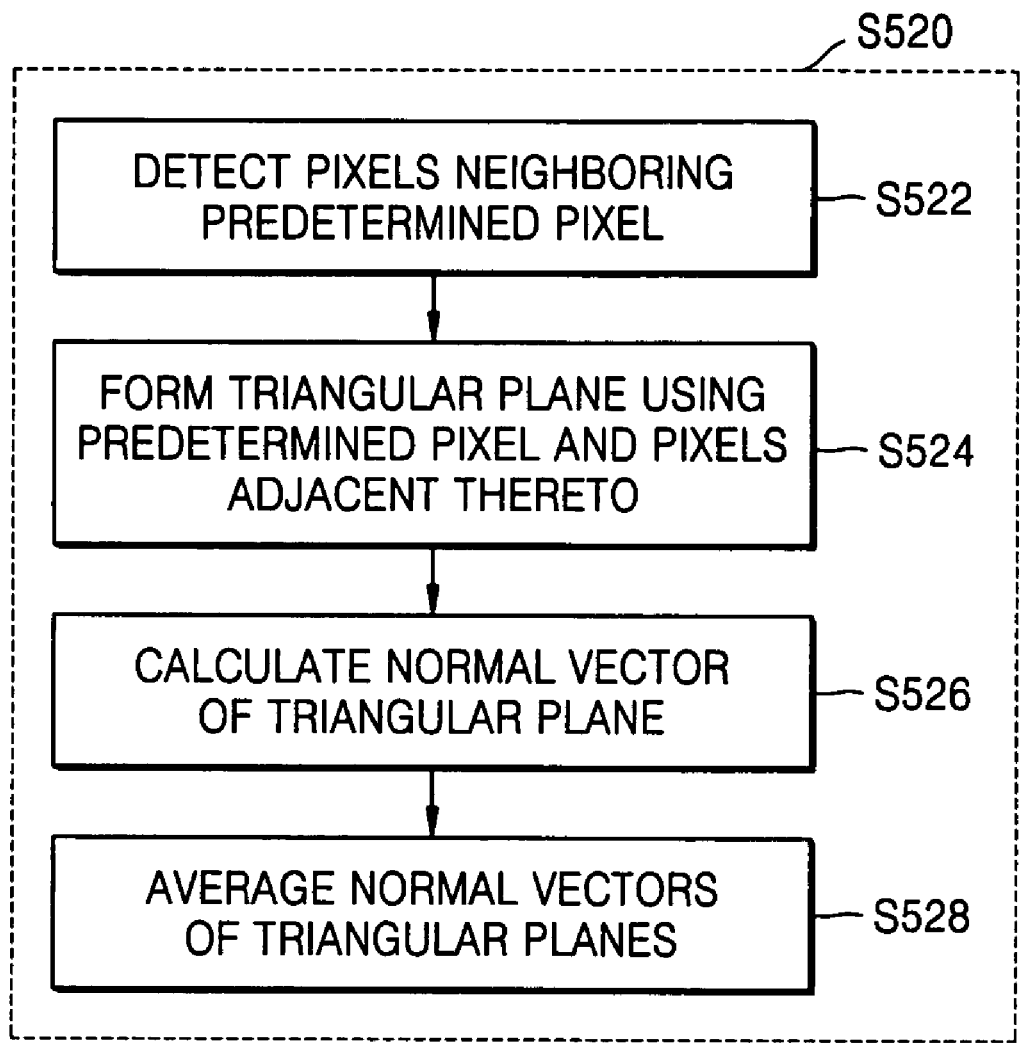

FIG. 5A is a flowchart of a method of removing redundant data of a simple texture model according to an embodiment of the present invention. Referring to FIGS. 4 and 5A, a plurality of simple texture images that render a predetermined 3D model and include color maps (color images) and depth maps (depth images) are input to the normal vector calculating unit 410 in operation S510. Locations of pixels in a 3D space, on which pixels of each of the depth maps are projected, are recovered, and additional attributes of the pixels of each of the depth maps, such as locations (x, y) of the pixels on each of the depth maps, sample sizes and normal vectors and reliabilities of the pixels of each of the depth maps, are calculated. The normal vector calculating unit 410 calculates normal vectors of the pixels of each of the depth maps in operation S520, a process which will be described later in greater detail with reference to FIG. 5B.

In operation S530, the reliability calculating unit 420 calculates the reliabilities of the pixels of each of the depth maps using the normal vectors of the pixels of each of the depth maps. Reliabilities of the pixels in a predetermined area of a depth map determine sampling quality in the predetermined area of the depth map. The reliability calculating unit 420 calculates the reliabilities of the pixels of each of the depth maps using Equation (1) below.

$$r = |(N_p, N_s)| \qquad (1)$$

In Equation (1), $N_p$ represents a normal vector perpendicular to the plane of vision of a camera, $N_s$ represents a normal vector of a predetermined sample s, which is perpendicular to the surface of a predetermined portion of the surface of the 3D model rendered by the predetermined sample s, $(N_p \cdot N_s)$ is the inner product of the normal vectors $N_p$ and $N_s$, and $|(N_p \cdot N_s)|$ is an absolute value of $(N_p \cdot N_s)$.

In operation S540, the proximity calculating unit 430 calculates three-dimensional proximities of the pixels of each of the depth maps to one another so as to search for a group of pixels rendering the same portion of the 3D model. More specifically, the proximity calculating unit 430 maps each of the pixels of each of the depth maps onto a 3D coordinate system and determines pixels located within a predetermined distance from one another in the 3D coordinate system as rendering the same portion of the 3D model.

In operation S550, the redundant data removing unit 440 receives the pixels determined as rendering the same portion of the 3D model, abandons the pixels with low reliabilities among the received pixels, and outputs a set of simple texture images, from which redundant data has been removed. More specifically, the redundant data removing unit 440 compares the reliabilities of pixels that are determined as rendering the same portion of the 3D model but originate from different depth maps, selects the pixel with the highest reliability, and abandons the remaining pixels so that they can be removed from their respective depth maps. The removed pixels, i.e., redundant pixels, are set to a value of 0 on their respective depth maps.

Figure 6:
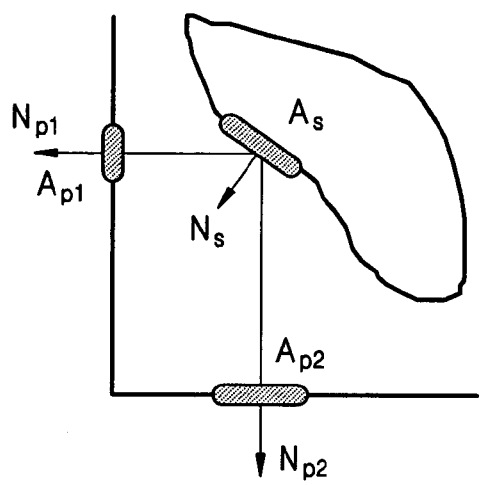
FIG. 6 is a diagram illustrating the reliability of a pixel in the present invention.

Referring to FIG. 6, the predetermined sample s has a higher reliability when projected onto a second plane $P_2$ than when projected onto a first plane $P_1$ because an angle formed by $(N_{p1}, N_s)$ is larger than an angle formed by $(N_{p2}, N_s)$. Here, $N_s$ represents the normal vector of the predetermined sample s. Therefore, samples projected onto the second plane $P_2$ can render geometrical information of the 3D model more satisfactorily than those projected onto the first plane $P_1$. Thus, the samples projected onto the first plane $P_1$ are removed from their respective depth maps because they are less reliable than those projected onto the second plane $P_2$.

FIG. 5B is a detailed flowchart illustrating the operation of the normal vector calculating unit 410. Referring to FIG. 5B, the normal vector calculating unit 410 projects the pixels of each of the depth maps onto the 3D space by referring to values of the pixels of each of the depth maps and detects two pixels adjacent to each of the pixels projected onto the 3D space in operation S522. In operation S524, the normal vector calculating unit 410 forms a plurality of triangular planes using the pixels projected onto the 3D space and their respective two adjacent pixels. In operation S526, the normal vector calculating unit 410 calculates normal vectors, which are perpendicular to the triangular planes. In operation S528, the normal vector calculating unit 410 calculates the normal vector of each of the pixels of each of the depth maps by averaging the normal vectors obtained in operation S526.

The apparatus removing redundant data of a simple texture model according to an embodiment of the present invention takes into consideration the fact that samples may have different sizes, and thus one big sample may completely block more than one smaller sample. In the present invention, where two samples having different sizes block each other, the larger one of the two is removed.

In the present invention, normal vectors are used for calculating reliabilities of samples. However, since a map of such normal vectors may unnecessarily increase a channel bandwidth for transmitting a 3D model to a user terminal, it is not included in the 3D model to be transmitted to the user terminal. In the present invention, the normal vectors are only used in pre-treatment processes and are recovered from depth maps using 3D information.

After redundant samples are removed from their respective depth maps, special processes may be necessary for improving the precision of the depth maps. As described above, the depth maps, from which redundant samples have been removed, may cause rendering noise. In other words, even normal vectors filtered out of the same sample of different depth maps are less likely to match with each other. The present invention solves this problem in the following manner. In the present invention, samples whose reliabilities differ from each other by a predetermined critical value or less are considered to have the same reliability. If redundant pixels, respectively recovered from different depth maps, have the same reliability, the ones to be removed are arbitrarily selected.

By removing redundant samples from their respective depth maps in the above-described manner, it is possible to obtain a non-redundant 3D model having pixels captured from different depth maps.

Figure 7:
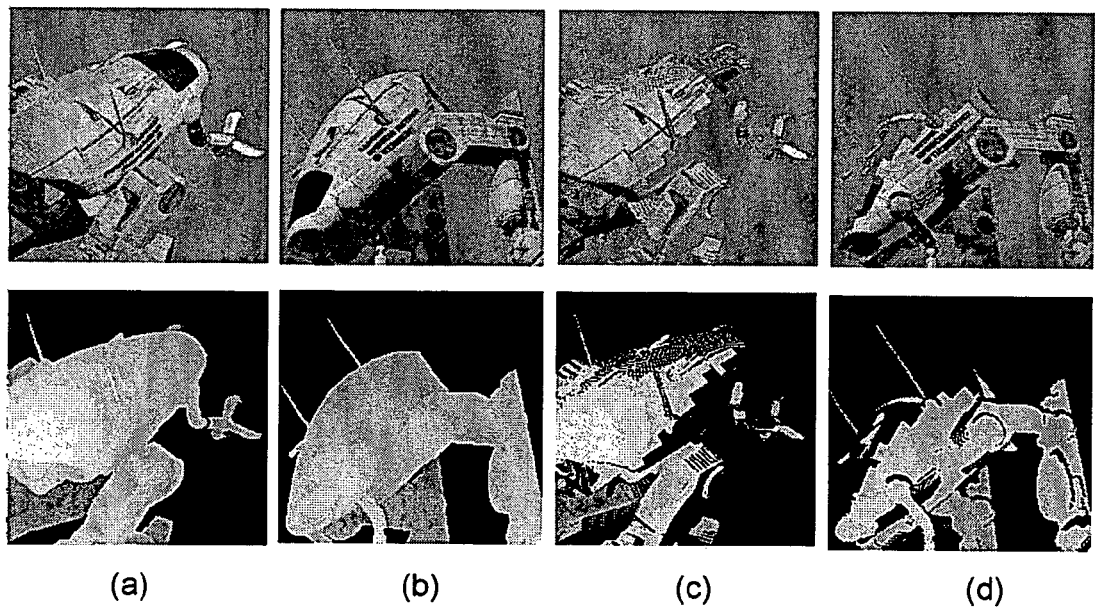
FIGS. 7(a) and 7(b) illustrate color maps and depth maps which have not yet been subjected to the method of removing redundant data of a simple texture model according to an embodiment of the present invention.
FIGS. 7(c) and 7(d) illustrate color maps and depth maps which have been subjected to the method of removing redundant data of a simple texture model according to an embodiment of the present invention.

FIGS. 7(a) and (b) illustrate color maps and depth maps of a robot model, which has not yet been subjected to the method of removing redundant data of a simple texture model according to an embodiment of the present invention. And, FIGS. 7(c) and 7(d) illustrate color maps and depth maps of the robot model which has been subjected to the method of removing redundant data of a simple texture model according to an embodiment of the present invention. Referring to FIGS. 7(a) through 7(d), the size of the robot model is dramatically decreased by removing a considerable number of redundant pixels. The decrease in the size of the robot model results in a high rendering speed.

Figure 8:
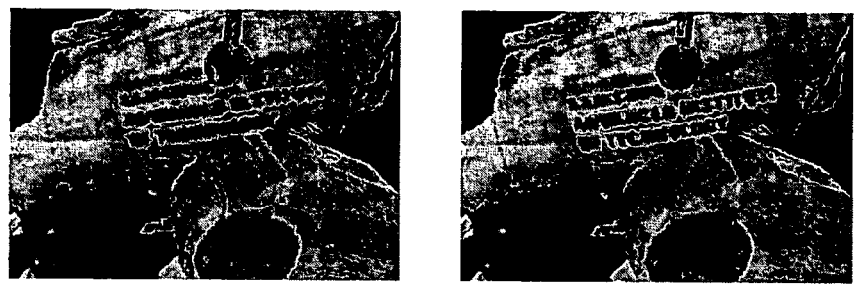
FIG. 8 presents enlarged views of FIGS. 7(b) and 7(d)

FIG. 8 shows enlarged views of FIGS. 7(b) and 7(d). Referring to FIG. 8, letters on the surface of the robot model are clearer on the right of FIG. 8, which corresponds to FIG. 7(d), than on the left of FIG. 8, which corresponds to FIG. 7(b). Therefore, it is possible to enhance rendering quality by using the method of removing redundant data of a simple texture model according to an embodiment of the present invention.

As described above, a conventional image-based rendering method using a simple texture model renders a 3D model using a simple texture model including color images and depth images. Therefore, the conventional image-based rendering method using a simple texture mode can achieve better rendering quality and higher rendering speed than a conventional rendering method using a 3D mesh model. However, the conventional image-based rendering method using a simple texture model still cannot render the texture of the surface of the 3D model satisfactorily.

In order to overcome limitations of the conventional image-based rendering method using a simple texture model, the present invention provides an image-based rendering method and apparatus using an extended simple texture model. The extended simple texture model is obtained by adding data regarding the texture of a 3D model to a typical simple texture model. The extended simple texture model includes additional information on each pixel rendering the surface of the 3D model.

An image-based rendering method and apparatus using an extended simple texture model according to an embodiment of the present invention will be described more fully in the following paragraphs.

In the image-based rendering method using an extended simple texture model, a 3D model is rendered using a plurality of depth images. Each of the depth images includes a set of information, such as information on a simple texture model and information on cameras used for creating the simple texture model. In the present invention, each of the depth images is redefined as an extended depth image (XDI), having depth maps, color maps, and characteristics 1, 2, ... of the 3D model. The characteristics of the 3D model are stored as 2D images, such as color maps and depth maps of the simple texture model. Therefore, it is possible to render attributes of the 3D model, such as bright and dark areas and shiny regions on the surface of the object, by storing values representing the characteristics of the 3D model.

A 3D model of an object can be differently rendered depending on a user's viewpoint of the object. Splat colors, which are one of the basic elements used in a process of rendering the 3D model of the object, are determined based on a predetermined viewpoint of the user, the texture of the surface of the 3D model rendered from the predetermined viewpoint, vectors normal to the surface of the 3D model rendered from the predetermined viewpoint, the user's location, and the location of the 3D model and a light source.

In the present invention, the 3D model is rendered by using a Phong reflectance model to render the degree to which light is reflected from the surface of the 3D model. The Phong reflectance model includes six coefficients for rendering the characteristics of the 3D model and a light source, i.e., normal vectors of pixels recovered from depth maps, an emission coefficient, an ambient coefficient, a diffuse coefficient, a specular coefficient, and a shininess coefficient. Some of the six coefficients, for example, the ambient coefficient and the emission coefficient, may be omitted or replaced by predetermined default values. A color image is considered as a diffuse map.

In the present invention, the 3D model is rendered using OpenGL, which is the standard for 2D/3D graphics. During the rendering of the 3D model, normal vectors of pixels, object parameters, and optical parameters are transmitted via a graphics pipeline. Current hardware accelerators (such as Nvidia GeForce) can quickly calculate a Phong reflectance model through hardware. In the present invention, a hardware rendering process may be carried out using an OpenGL rendering pipeline. In a case where a hardware accelerator is not available for some reason, a software rendering process may be carried out instead.

Figure 9:
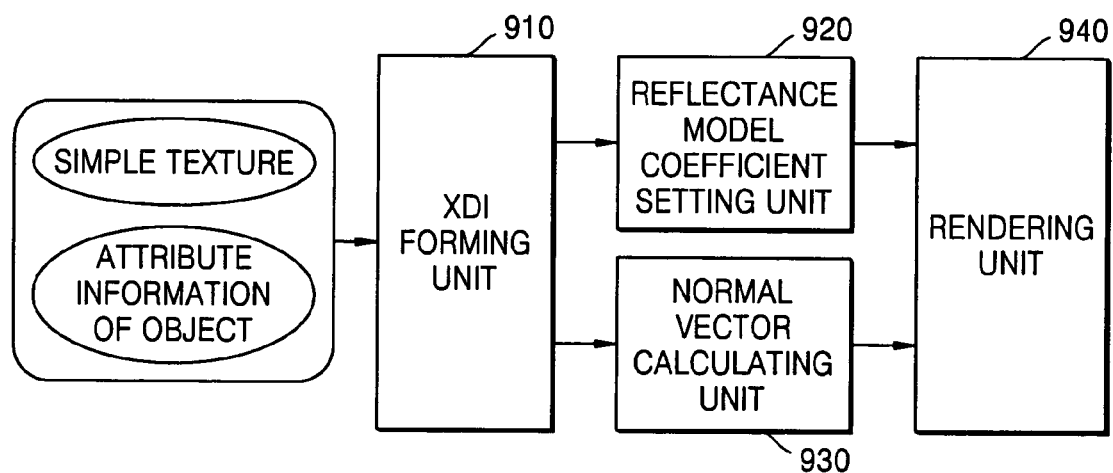
FIG. 9 is a block diagram of a rendering apparatus using an extended depth image, according to an embodiment of the present invention.
Figure 10:
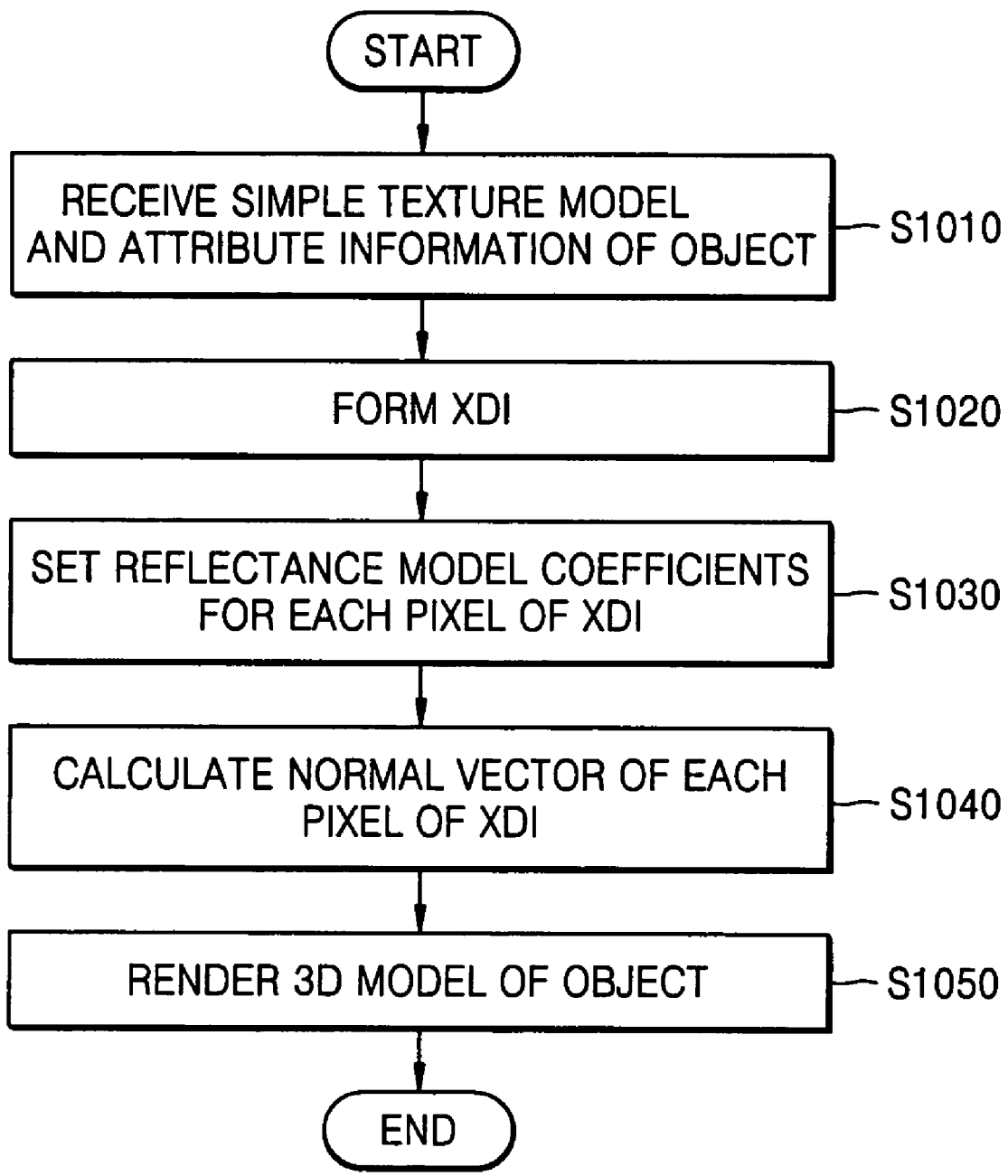
FIG. 10 is a flowchart of a rendering method using an extended depth image, according to an embodiment of the present invention.

FIG. 9 is a block diagram of a rendering apparatus using an extended depth image, according to an embodiment of the present invention, and FIG. 10 is a flowchart of a rendering method using an extended depth image, according to an embodiment of the present invention. Referring to FIGS. 9 and 10, the rendering apparatus includes an XDI forming unit 910, a reflectance model coefficient setting unit 920, a normal vector calculating unit 930, and a rendering unit 940. The XDI forming unit 910 receives a simple texture model and attribute information of a 3D model of an object in operation S1010. The simple texture model input into the XDI forming unit 910 includes color maps and depth maps. The attribute information of the object input into the XDI forming unit 910 includes emission, ambient, specular, and shininess components for the 3D model. The specular component renders variation of the degree to which light is reflected from the surface of the 3D model, depending on the user's viewpoint of the 3D model, and the shininess component renders variation of the degree of light reflection from the surface of the 3D model, depending on the texture of the surface of the 3D model. The specular and shininess components may be generated in the form of 2D maps by using an image editing program, such as Photoshop, and the 2D image maps are input into the XDI forming unit 910.

In operation S1020, the XDI forming unit 910 forms an extended depth image using the simple texture model and the attribute information of the 3D model. As described above, the XDI has depth images, color images, and characteristics 1, 2, . . . of the 3D model. The XDI forming unit 910 outputs the XDI to the reflectance model coefficient setting unit 920 and the normal vector calculating unit 930.

The reflectance model coefficient setting unit 920 sets predetermined coefficients, which are used for calculating a Phong reflectance model in Equation (2) below.

$$\text{color} = E + I_a K_a + \sum S_i \frac{1}{k_c + k_l * d + k_q d^2} \times (I_{ai} K_a + \max\{(l, n), 0\} I_{di} K_d + (\max\{(r, v), 0\})^p I_{si} K_s) \quad (2)$$

In Equation (2), $K_s$, $K_a$, and $K_d$ represent specular, ambient and diffuse components, respectively, p represents a shininess value of a predetermined pixel of the XDI, r represents a direction of light reflected from the 3D model, v represents a direction in which the 3D model is viewed, l represents a direction of a light source, n represents a normal vector of the predetermined pixel, $S_i$ represents the intensity of light emitted from the light source, $K_c$, $K_l$, and $K_q$ represent attenuation coefficients of the light emitted from the light source, d represents a distance between the 3D model and the light source, and $I_{ai}$, $I_{si}$, and $I_{di}$ represent ambient, specular, and diffuse colors, respectively, of an i-th light source.

The reflectance model coefficient setting unit 920 sets $K_s$, $K_a$, $K_d$, p, $I_{ai}$, $I_{si}$, and $I_{di}$ for each pixel of the XDI according to predetermined rules or algorithms. The reflectance model coefficient setting unit 920 groups pixels of the XDI having the same values of variables so that they can be processed together.

The normal vector calculating unit 930 determines the normal vector n of each pixel of the XDI based on depth information of the XDI, a process which has already been described above with reference to FIG. 5B.

In operation S1050, the rendering unit 940 renders the 3D model by calculating a color value of each pixel of the XDI using Equation (2) above based on the reflectance model coefficients $K_s$, $K_a$, $K_d$, p, $I_{ai}$, $I_{si}$, and $I_{di}$ and normal vector n of each pixel of the XDI. The rendering unit 940 calculates a Phong reflectance model by adjusting a splat size and inputs the reflectance model coefficients $K_s$, $K_a$, $K_d$, p, $I_{ai}$, $I_{si}$, and $I_{di}$ and normal vector n of each pixel of the XDI, the 3D location of each pixel of the XDI, to a 3D graphics accelerator, such as OpenGL, and renders the 3D model of the object using the calculated Phong reflectance model. In a case where such a hardware graphics accelerator is not available, the rendering unit 940 can carry out the above rendering process through software rather than using hardware.

Figure 11:
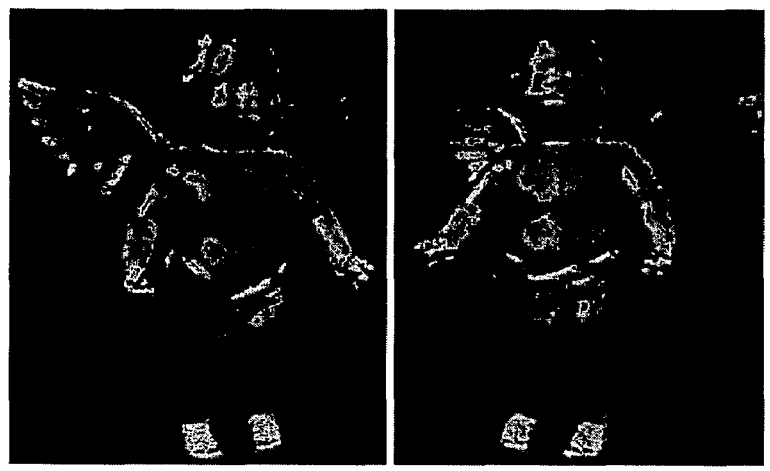
FIG. 11 is a diagram illustrating 3D models rendered using an extended depth image.

FIG. 11 illustrates 3D models rendered using a single XDI 4-element map. Referring to FIG. 11, attributes of a metallic object varying from viewpoint to viewpoint, such as reflected light and glitter on the surface of the metallic object, are successfully rendered.

An image-based image editing apparatus and method according to an embodiment of the invention will now be described more fully. Conventional image editing techniques for modifying the surface of a textured 3D model are complicated and inconvenient, especially when there is a need to color the surface of the textured 3D model or apply a displacement mapping technique to the surface of the textured 3D model of the object. In order to overcome the above limitations of the conventional image editing techniques, the present invention provides an image-based editing apparatus and method.

In the present invention, a user can edit a 3D model by editing one of reference images constituting the 3D model, three-dimensionally configuring samples of each of the other reference images, and projecting the three-dimensionally configured samples of each of the other reference images onto the edited reference image. If the samples of each of the other reference images projected onto the edited reference image are located less than a predetermined critical distance apart from their respective pixels of the edited reference image, they should be edited. By doing so, consistency among the reference images of the 3D model is obtained. In the present invention, additional data structures such as 3D meshes are not generated, which is desirable. Therefore, in the present invention it is not necessary to perform complicated computations for forming intermediate models. In other words, modifications made to one reference image of the 3D model are automatically applied to the other reference images of the 3D model. In addition, it is possible to capture an image of the 3D model and edit the captured image while rendering the 3D model, and to edit the reference images of the 3D model based on modifications made to the captured image.

This type of editing method is called a back-propagation editing method because it involves editing one of the reference images of the 3D model and then editing the other reference images by comparing them with the first edited reference image.

Figure 12:
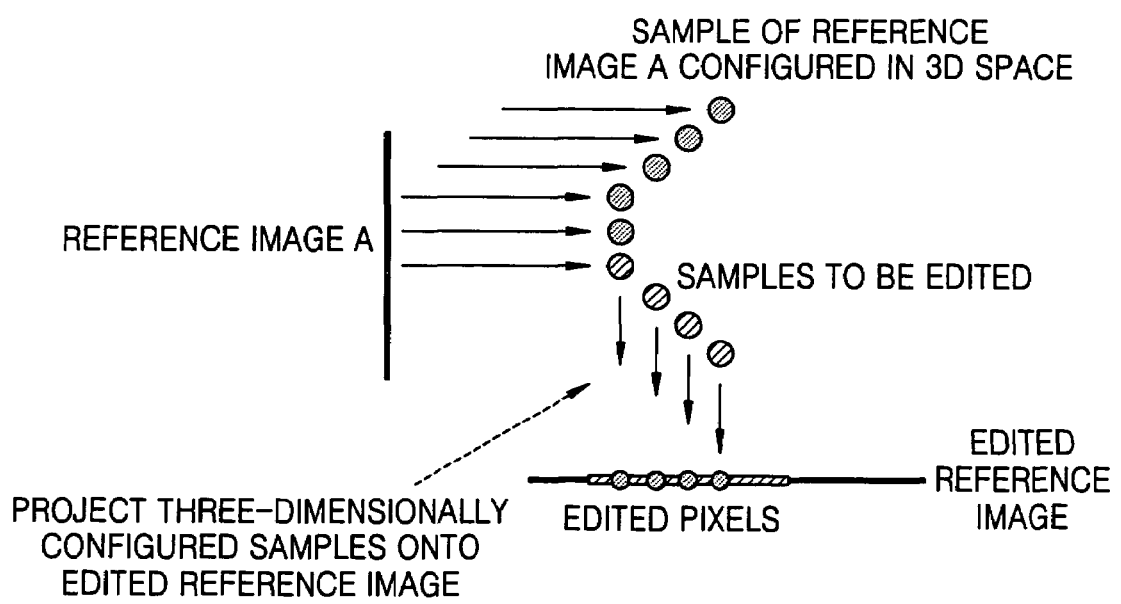
FIG. 12 is a diagram illustrating principles of a back-propagation process according to an embodiment of the present invention.

FIG. 12 illustrates principles of a back-propagation editing method. Referring to FIG. 12, a horizontal map is an edited reference image, and a vertical map A is a reference image to be edited based on the edited reference image. Pixels of the vertical map A are three-dimensionally configured and back-projected onto the horizontal map so that they respectively correspond to pixels of the horizontal map. Of the pixels of the vertical map A projected onto the horizontal map, those located less than a predetermined critical distance from their respective pixels of the horizontal map are edited by replacing their color information with color information of their respective pixels of the horizontal map.

In the present invention, the user can adjust the degree to which modifications made to one of the reference images of the 3D model are back-propagated to the others, by appropriately setting critical values. This is very important for reference images having low resolution, in particular because such a small number of bits allotted for quantization can result in samples recovered from different reference images of the surface of an object having different depth values even though they render the same portion of the 3D model. In order to solve this problem, the present invention provides a selective editing method, in which the amount of the 3D model to be edited can be adjusted by setting a predetermined critical value. For example, if the predetermined critical value is set to its maximum, it is determined that all the samples of each of the reference images of the 3D model projected onto the edited reference image are to be edited.

Figure 13:
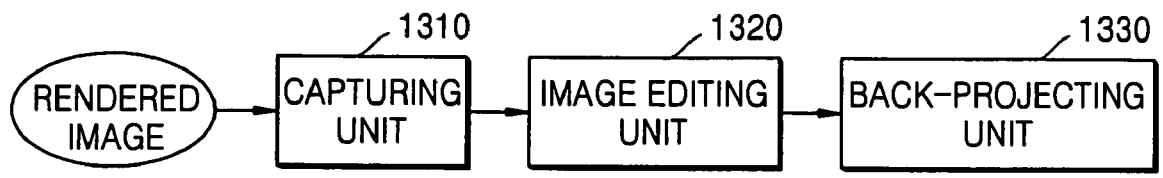
FIG. 13 is a block diagram of an image-based editing apparatus according to an embodiment of the present invention.
Figure 14A:
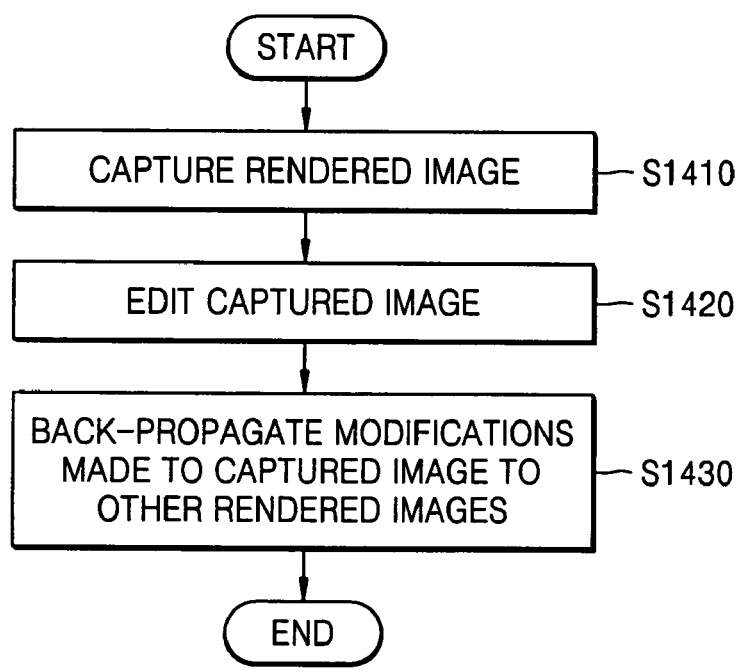
FIGS. 14A and 14B are flowcharts of an image-based editing method according to an embodiment of the present invention.
Figure 14B:
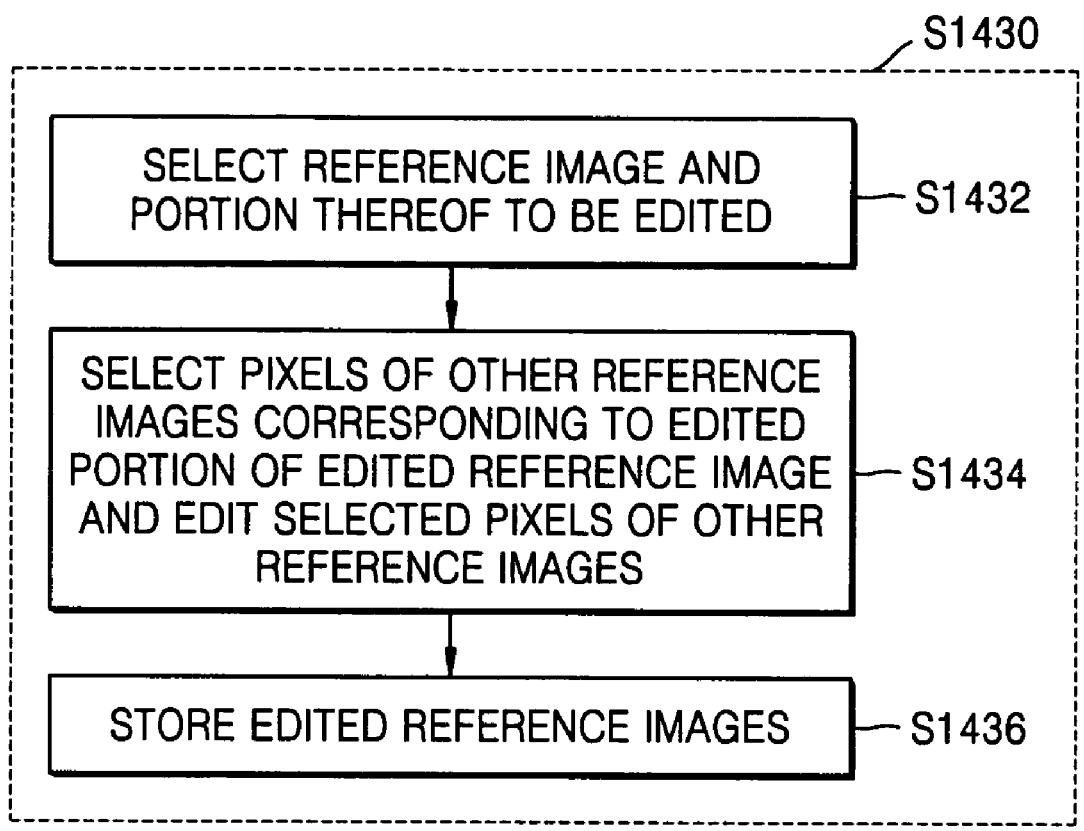

FIG. 13 is a block diagram of an image-based editing apparatus according to an embodiment of the present invention, and FIGS. 14A and 14B are flowcharts of an image-based editing method according to an embodiment of the present invention. Referring to FIG. 13, the image-based editing apparatus includes a capturing unit 1310, an editing unit 1320, and a back-projecting unit 1330. Referring to FIG. 14A, in operation S1410, a set of reference images of a 3D model, which are obtained by using a conventional rendering method using a simple texture model, is input into the image capturing unit 1310, and the capturing unit 1310 stops rendering the 3D model and captures one of the reference images of the 3D model to be edited.

In operation S1420, the editing unit 1320 edits the captured reference image using one of the following editing methods: a paint editing method, a light paint editing method, a deleting paint editing method, and a copy editing method, which will be described later in greater detail.

The back-projecting unit 1330 back-projects information on the edited reference image, i.e., modifications made to the captured reference image, to other reference images so that the other reference images can be edited consistent with the edited reference image.

FIG. 14B is a detailed flowchart of operation S1430 of FIG. 14A. Referring to FIG. 14B, in operation S1432, the back-projecting unit 1330 selects reference images to be edited and determines which portions of each of the selected reference images are to be edited, based on the modifications made to the captured reference image. In operation S1434, the back-projecting unit 1330 selects pixels of each of the selected reference images corresponding to an edited portion of the captured reference image and edits each of the selected reference images by back-projecting the modifications made to the captured reference image to the selected pixels of each of the selected reference images. In operation S1436, the back-projecting unit 1330 stores results of the back-projection and renews the simple texture model using the back-projection results.

Operation S1420 will now be described in greater detail with reference to FIGS. 15A through 15C. The present invention provides a paint editing method for editing the texture of a non-compressed simple texture model. The paint editing method uses a typical image editing program, such as Paint-Brush or Photoshop, and is based on the principles of the above-described back-projection editing method.

The paint editing method is performed according to the following algorithm. During rendering a 3D model, a user selects one of reference images of the 3D model as one to be paint-edited and captures the selected reference image. The captured reference image is edited using an image editing program such as Photoshop. Information on modifications made to the captured reference image is back-propagated to the other reference images. If samples of each of the other reference images projected onto the captured reference image have different colors from their respective pixels of the captured reference image, their colors need to be edited based on the colors of their respective pixels of the captured reference image.

Figure 16:
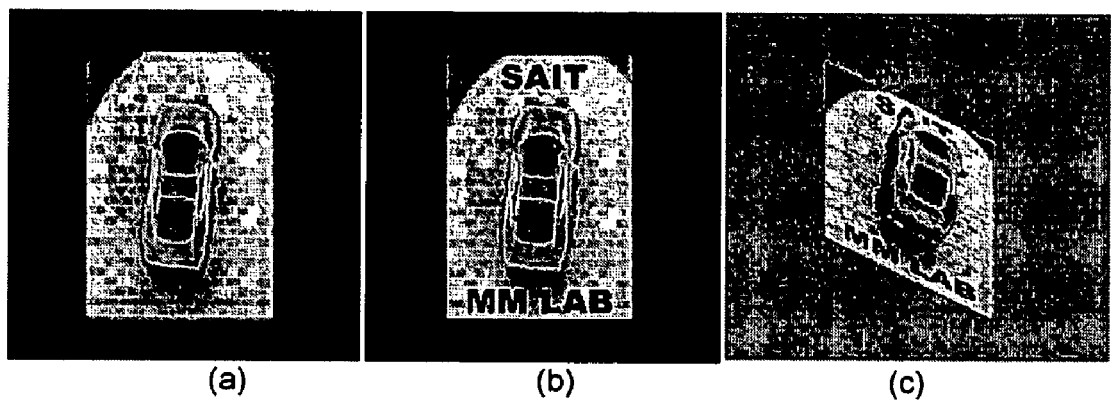
FIG. 16 illustrates 3D models rendered using a paint editing method according to an embodiment of the present invention.

FIGS. 16(a) through 16(c) illustrate 3D models edited using the paint editing method according to an embodiment of the present invention. Letters are written on a captured reference image, as shown in FIG. 16(c), and then back-propagated to another reference image, as shown in FIG. 16(c). After the back-propagation process, a corresponding 3D model can still be rendered. As shown in FIGS. 16(a) through 16(c), modifications made to one reference image of a 3D model captured at one point by using the paint editing method according to an embodiment of the present invention are back-propagated only to reference images of the 3D model rendered thereafter.

Figure 15A:
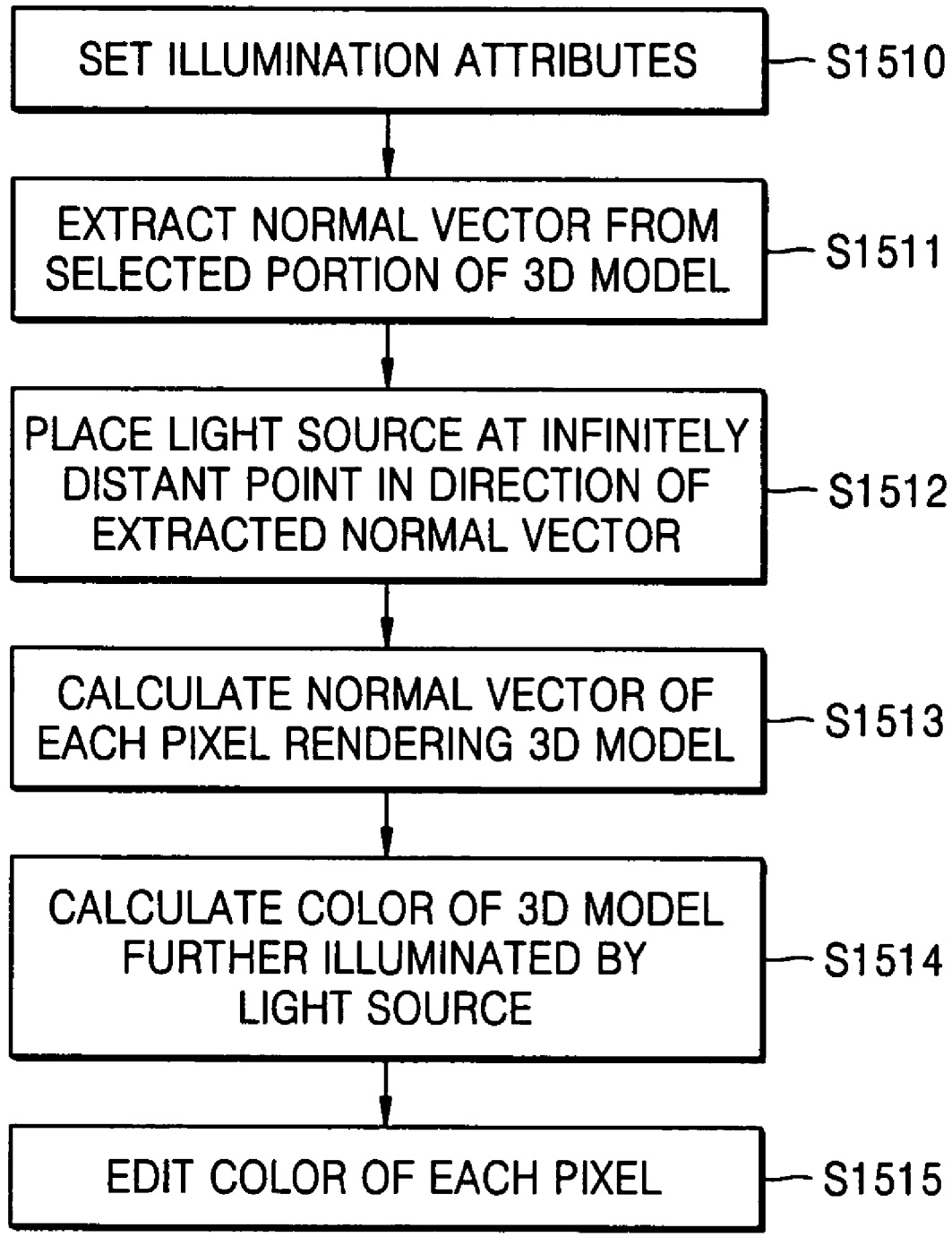
FIG. 15A is a flowchart of a light paint editing method according to an embodiment of the present invention.

FIG. 15A is a flowchart of a light paint editing method according to an embodiment of the present invention. For example, in a case where an additional source of light is further installed, a simple texture model of a 3D model needs to be edited to reflect the change in the intensity of illumination. To this end, the present invention provides a light paint editing method. A change in the texture of the 3D model, caused by the change in illumination, is calculated using the above-described Phong reflectance model, which needs normal vectors of samples rendering the surface of the 3D model. The simple texture model, however, does not include normal vector maps. Thus, the normal vectors should be obtained from depth maps of the simple texture model.

Referring to FIG. 15A, in operation S1510, a user selects one of reference images of the 3D model as one to be light-paint-edited and captures the selected reference image in the middle of rendering the 3D model, and sets variables concerning illumination attributes, such as the location, direction, and color of a light source to be newly added. In operation S1511, a predetermined portion of the 3D model is selected, and a normal vector is extracted from the selected portion. In operation S1512, the light source is placed at an infinitely distant point in the direction of the extracted normal vector so that the 3D model in the captured reference image is further illuminated.

In operation S1513, normal vectors of pixels of the captured reference image are calculated using the method described above with reference to FIG. 5B. In operation S1514, the color of the 3D model, which is further illuminated by the newly added light source, is calculated using the above-described Phong reflectance model. In operation S1515, the color of each of the pixels of the captured reference image is changed based on the color of the 3D model obtained in operation S1514.

Figure 15B:
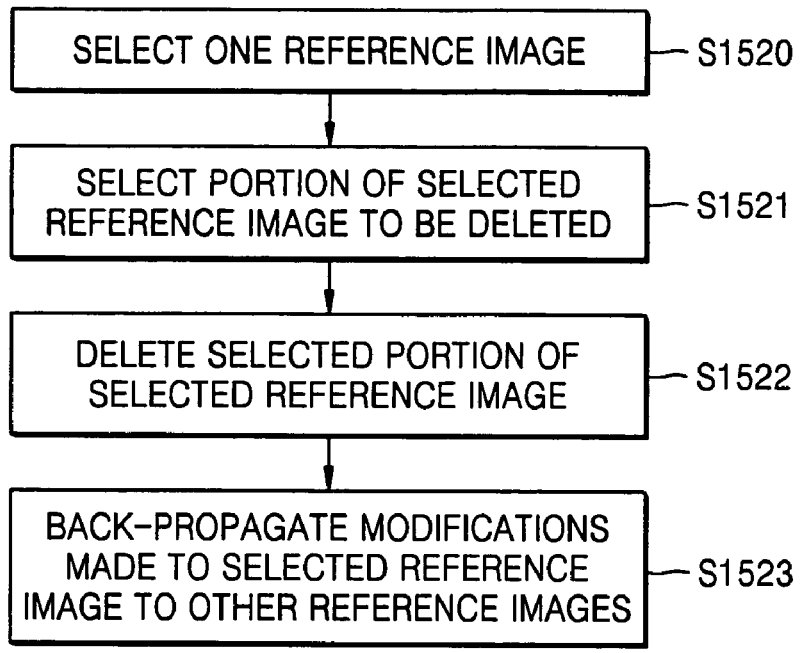
FIG. 15B is a flowchart of a deletion editing method according to an embodiment of the present invention.
Figure 17:
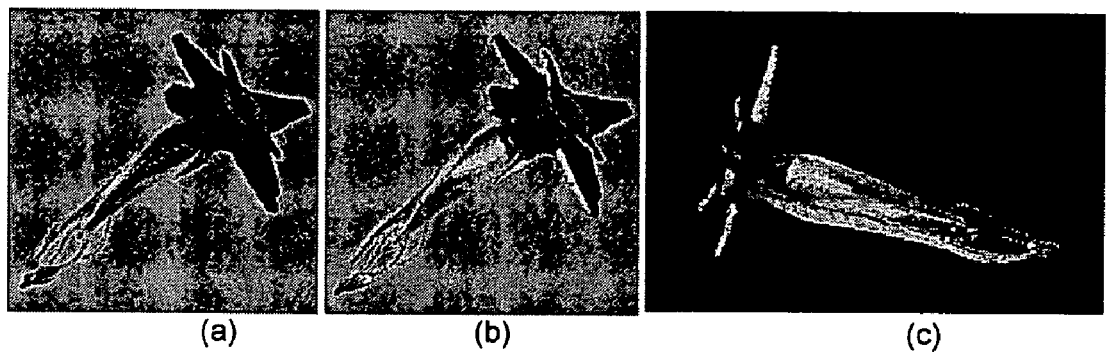
FIG. 17 illustrates 3D models rendered using a light paint editing method according to an embodiment of the present invention.

FIGS. 17(a) through 17(c) illustrate 3D models edited using the light paint editing method of FIGS. 15A and 15B. As shown in FIGS. 17(a) and 17(b), a 3D model rendered in a reference image is further illuminated by editing the reference image using the light painting editing method according to an embodiment of the present invention. After the light paint editing process, the 3D model can still be rendered. Therefore, modifications made to a reference image of the 3D model captured at one point by using the light paint editing method according to an embodiment of the present invention, are back-propagated only to reference images of the 3D model rendered thereafter.

Brief descriptions of a selective editing method, a deletion editing method, and a copy editing method according to embodiments of the invention will be presented in the following paragraphs.

A set of reference images of a simple texture model includes information on a 3D model of an object. A user can separate any desired portions from a model by using a selective editing method according to an embodiment of the present invention. In the selective editing method, bit images are respectively associated with reference images, and pixels of a predetermined reference image respectively correspond to bits of a bit image corresponding to the predetermined reference image. Therefore, if a bit of the bit image corresponding to the predetermined reference image is set to a value of 1, its corresponding pixel of the predetermined reference image is considered selected. The user may select a set of pixels of an arbitrary reference image using a brush with a variable size. Once the arbitrary reference image is edited, modifications made to the arbitrary reference image are back-propagated to other reference images so that the other reference images can be edited consistent with the edited arbitrary reference image. Samples of each of the other reference images are three-dimensionally configured and projected onto the edited arbitrary reference image. Thereafter, among the samples of each of the other reference images projected onto the edited arbitrary reference image, those located less than a predetermined distance from their respective pixels of the edited arbitrary reference image are selected, and their corresponding bits of bit images respectively corresponding to the other reference images are set to a value of 1.

The selected pixels of each of the other reference images of the 3D model can be deleted by using a deletion editing method according to an embodiment of the present invention, in which a selected portion of the 3D model is deleted. The selected portion of the 3D model can be copied by using a copy editing method according to an embodiment of the present invention. A new complete image can be created using portions selected from different reference images, at least one portion of each of which is selected by using the selective editing method according to an embodiment of the present invention, by using a predetermined reference camera. Selected pixels of a predetermined reference image are all copied to a newly copied reference image by using the copy editing method according to an embodiment of the present invention, and the remaining pixels of the predetermined reference image are set to a depth value of 0 so that they render a background image. A reference image newly created in the above-described manner is separately stored so that it can be reserved for a new simple texture model.

The deletion editing method according to an embodiment of the present invention will now be described more fully with reference to FIGS. 15B and 15C.

Referring to FIG. 15B, in the case of deleting a portion of a 3D model, a reference image is selected in operation S1520, and a portion of the selected reference image to be deleted is selected in operation S1521. The selected portion of the selected reference image is deleted in operation S1522, a process which has already been described above. Information on changes made to the selected reference image is back-propagated to other reference images in operation S1523.

Figure 15C:
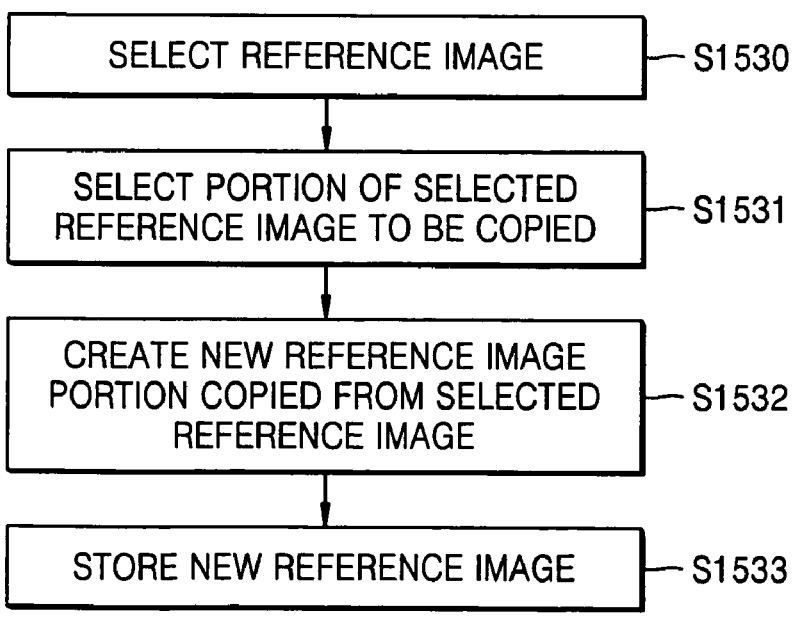
FIG. 15C is a flowchart of a copy editing method according to an embodiment of the present invention.
Figure 18:
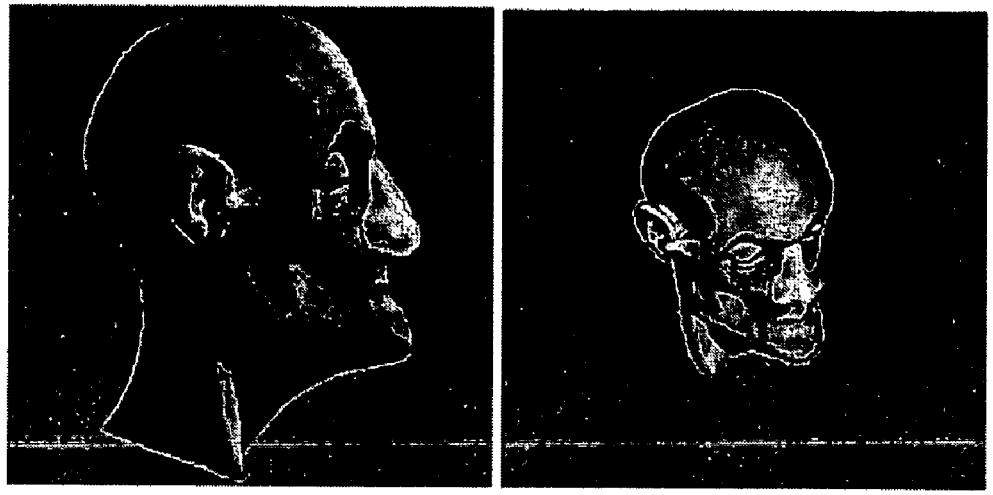
FIGS. 18(a), 18(b), and 18(c) illustrate 3D models rendered using a selective editing method according to an embodiment of the present invention, a deletion editing method according to an embodiment of the present invention, and a copy editing method according to an embodiment of the present invention, respectively.
Figure 18:
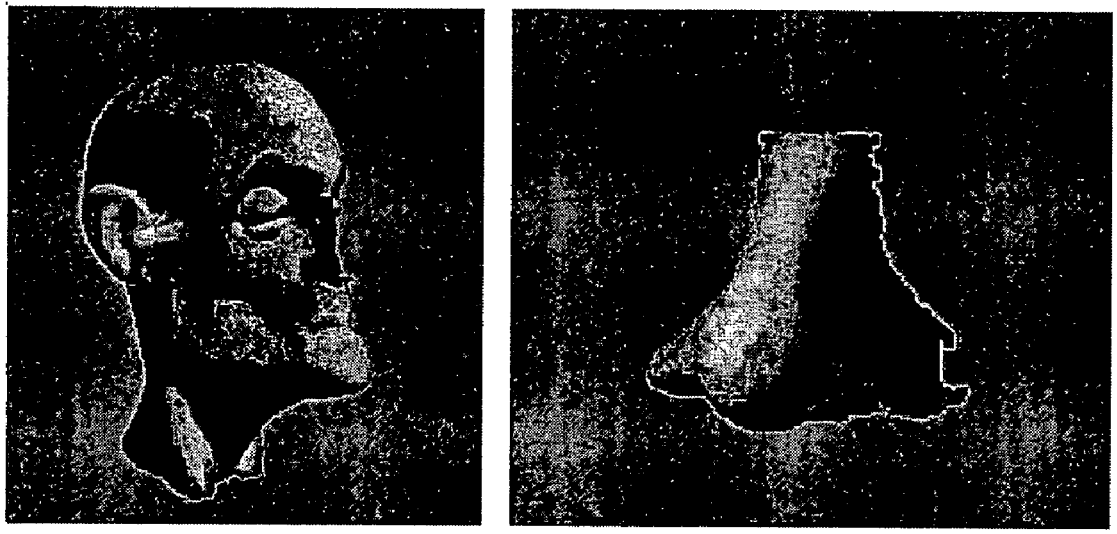

Referring to FIG. 15C, in the case of copying a portion of a 3D model, a reference image is selected in operation S1530, and a portion of the selected reference image to be copied is selected in operation S1531. A new reference image is created using the selected portion copied from the selected reference image in operation S1532 and is stored in operation S1533. FIGS. 18(a) through 18(c) illustrate 3D models edited using the selective editing method, the deletion editing method, and the copy editing method according to embodiments of the present invention, respectively.

The present invention can be realized as computer-readable codes written on a computer-readable recording medium. The computer-readable recording medium includes all types of recording devices, in which data can be stored in a computer-readable manner. For example, the computer-readable recording medium includes ROM, RAM, CD-ROM, a magnetic tape, a floppy disk, an optical data storage device. The computer-readable recording medium can be distributed over a plurality of computer systems connected to one another in a network so that the computer-readable codes are stored therein and executed therefrom in a decentralized manner.

As described above, the method and apparatus for removing redundant data of a simple texture model according to the embodiments of the present invention can enhance rendering speed and rendering quality by removing redundant data of the simple texture model that render the same portion of a 3D model of an object from different viewpoints.

In addition, it is possible to successfully render the surface characteristics of the 3D model, such as glitter and shade variations on the surface of the 3D model, by using an extended depth image (XDI).

Moreover, it is possible to edit the 3D model by simply editing 2D reference images thereof.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of removing redundant data of a simple texture model, the method comprising:

calculating normal vectors of pixels projected into a three-dimensional (3D) space by using depth images among a plurality of simple texture images, the plurality of simple texture images rendering different aspects of a 3D model;

calculating reliabilities of the pixels of each of the simple texture images by using the calculated normal vectors of the pixels; and comparing the reliabilities of pixels that originate from different simple texture images but render a same portion of the 3D model and removing the pixels having low reliabilities from the different simple texture images from which they respectively originate, wherein the calculation of the reliabilities of the pixels comprises considering pixels that have reliabilities that differ from each other by a predetermined critical value or less are as having a same reliability.

2. The method of claim 1, wherein in the calculation of the reliability of the pixels, the normal vectors of the pixels of each of the simple texture images are calculated by projecting the pixels of each of the simple texture images onto the 3D space based on values of the pixels of each of the depth images and calculating normal vectors of triangular planes which are respectively formed using the pixels projected onto the 3D space and two adjacent pixels.

3. A method of removing redundant data of a simple texture model, the method comprising:

calculating normal vectors of pixels projected into a three-dimensional (3D) space by using death images among a plurality of simple texture images, the plurality of simple texture images rendering different aspects of a 3D model;

calculating reliabilities of the pixels of each of the simple texture images by using the calculated normal vectors of the pixels; and comparing the reliabilities of pixels that originate from different simple texture images but render a same portion of the 3D model and removing the pixels having low reliabilities from the different simple texture images from which they respectively originate, wherein the calculation of the normal vectors of the pixels comprises:

projecting the pixels of each of the simple texture images onto the 3D space based on the values of the pixels of each of the depth images and detecting the pixels adjacent to each of the pixels projected onto the 3D space;

forming triangular planes using the pixels projected onto the 3D space and two adjacent pixels and calculating normal vectors of the triangular planes; and averaging the calculated normal vectors of the triangular planes.

4. The method of claim 1, wherein in the calculation of the reliabilities of the pixels, the reliabilities of the pixels of each of the simple texture images are calculated using the calculated normal vectors of the pixels of each of the simple texture images and a vector perpendicular to a plane of vision of a camera used for creating the simple texture images.

5. A method of removing redundant data of a simple texture model, the method comprising:

calculating normal vectors of pixels projected into a three-dimensional (3D) space by using depth images among a plurality of simple texture images, the plurality of simple texture images rendering different aspects of a 3D model;

calculating reliabilities of the pixels of each of the simple texture images by using the calculated normal vectors of the pixels; and comparing the reliabilities of pixels that originate from different simple texture images but render a same portion of the 3D model and removing the pixels having low reliabilities from the different simple texture images from which they respectively originate, wherein in the calculation of the reliabilities of the pixels, the reliabilities of the pixels of each of the simple texture images are determined depending on inner products of the normal vectors of the pixels of each of the simple texture images and a vector perpendicular to a plane of vision of a camera used for creating the simple texture images.

6. The method of claim 1, wherein the calculation of the reliabilities of the pixels comprises calculating proximities of the pixels of each of the simple textures to one another in the 3D space and determining pixels located a predetermined critical distance or less apart from one another as rendering a same portion of the 3D model.

7. The method of claim 1, wherein in the comparing the reliabilities of the pixels, all pixels rendering the same portion of the 3D model but originating from different simple texture images, except for the one having the highest reliability, are removed from the different simple texture images from which all the pixels respectively originate.

8. A method of removing redundant data of a simple texture model, the method comprising:

calculating normal vectors of pixels projected into a three-dimensional (3D) space by using depth images among a plurality of simple texture images, the plurality of simple texture images rendering different aspects of a 3D model;

calculating reliabilities of the pixels of each of the simple texture images by using the calculated normal vectors of the pixels; and comparing the reliabilities of pixels that originate from different simple texture images but render a same portion of the 3D model and removing the pixels having low reliabilities from the different simple texture images from which they respectively originate, wherein in the comparing the reliabilities of the pixels, pixels of each of the depth images having low reliabilities are set as pixels of a background image.

9. A computer-readable recording medium, on which computer-readable program codes executing a method of removing redundant data of a simple texture model, the method comprising:

calculating normal vectors of pixels projected into a three-dimensional (3D) space by using depth images among a plurality of simple texture images, the plurality of simple texture images rendering different aspects of a 3D model;

calculating reliabilities of the pixels of each of the simple texture images by using the calculated normal vectors of the pixels; and comparing the reliabilities of pixels that originate from different simple texture images but render a same portion of the 3D model and removing the pixels having low reliabilities from the different simple texture images from which they respectively originate, wherein the calculation of the reliabilities of the pixels comprises considering pixels that have reliabilities that differ from each other by a predetermined critical value or less are as having a same reliability.

10. The computer-readable recording medium of claim 9, wherein in the calculation of the reliability of the pixels, the normal vectors of the pixels of each of the simple texture images are calculated by projecting the pixels of each of the simple texture images onto the 3D space based on values of the pixels of each of the depth images and calculating normal vectors of triangular planes which are respectively formed using the pixels projected onto the 3D space and two adjacent pixels 11. A computer-readable recording medium, on which computer-readable program codes executing a method of removing redundant data of a simple texture model, the method comprising:

calculating normal vectors of pixels projected into a three-dimensional (3D) space by using depth images among a plurality of simple texture images, the plurality of simple texture images rendering different aspects of a 3D model;

calculating reliabilities of the pixels of each of the simple texture images by using the calculated normal vectors of the pixels; and comparing the reliabilities of pixels that originate from different simple texture images but render a same portion of the 3D model and removing the pixels having low reliabilities from the different simple texture images from which they respectively originate, wherein the calculation of the normal vectors of the pixels comprises:

projecting the pixels of each of the simple texture images onto the 3D space based on the values of the pixels of each of the depth images and detecting the pixels adjacent to each of the pixels projected onto the 3D space;

forming triangular planes using the pixels projected onto the 3D space and two adjacent pixels and calculating normal vectors of the triangular planes; and averaging the calculated normal vectors of the triangular planes.

12. The computer-readable recording medium of claim 9, where in the calculation of the reliabilities of the pixels, the reliabilities of the pixels of each of the simple texture images are calculated using the calculated normal vectors of the pixels of each of the simple texture images and a vector perpendicular to a plane of vision of a camera used for creating the simple texture images.

13. A computer-readable recording medium, on which computer-readable program codes executing a method of removing redundant data of a simple texture model, the method comprising:

calculating normal vectors of pixels projected into a three-dimensional (3D) space by using depth images among a plurality of simple texture images, the plurality of simple texture images rendering different aspects of a 3D model;

calculating reliabilities of the pixels of each of the simple texture images by using the calculated normal vectors of the pixels; and comparing the reliabilities of pixels that originate from different simple texture images but render a same portion of the 3D model and removing the pixels having low reliabilities from the different simple texture images from which they respectively originate, wherein in the calculation of the reliabilities of the pixels, the reliabilities of the pixels of each of the simple texture images are determined depending on inner products of the normal vectors of the pixels of each of the simple texture images and a vector perpendicular to a plane of vision of a camera used for creating the simple texture images.

14. The computer-readable recording medium of claim 9, wherein the calculation of the reliabilities of the pixels comprises calculating proximities of the pixels of each of the simple textures to one another in the 3D space and determining pixels located a predetermined critical distance or less apart from one another as rendering a same portion of the 3D model.

15. The computer-readable recording medium of claim 9, wherein in the comparing the reliabilities of the pixels, all pixels rendering the same portion of the 3D model but originating from different simple texture images, except for the one having the highest reliability, are removed from the different simple texture images from which all the pixels respectively originate.

16. A computer-readable recording medium, on which computer-readable program codes executing a method of removing redundant data of a simple texture model, the method comprising:

calculating normal vectors of pixels projected into a three-dimensional (3D) space by using depth images among a plurality of simple texture images, the plurality of simple texture images rendering different aspects of a 3D model;

calculating reliabilities of the pixels of each of the simple texture images by using the calculated normal vectors of the pixels; and comparing the reliabilities of pixels that originate from different simple texture images but render a same portion of the 3D model and removing the pixels having low reliabilities from the different simple texture images from which they respectively originate, wherein in the comparing the reliabilities of the pixels, pixels of each of the depth images having low reliabilities are set as pixels of a background image.

17. An apparatus removing redundant data of a simple texture model, the apparatus comprising:

a normal vector calculating unit, which calculates normal vectors of pixels projected onto a three-dimensional (3D) space by using depth images among a plurality of simple texture images that render different aspects of a 3D model;

a reliability calculating unit, which calculates reliabilities of the pixels of each of the simple texture images by using the calculated normal vectors obtained by the normal vector calculating unit; and a redundant data removing unit, which compares the reliabilities of the pixels originating from different simple texture images but rendering the same portion of the 3D model and removes the pixels having low reliabilities from the different simple texture images from which they respectively originate, wherein the reliability calculating unit considers pixels that have reliabilities that differ from each other by a predetermined critical value or less are as having a same reliability.

18. The apparatus of claim 17, wherein the normal vector calculating unit calculates the normal vectors of the pixels of each of the simple texture images by projecting the pixels of each of the simple texture images onto the 3D space based on values of the pixels of each of the depth images and calculating normal vectors of triangular planes which are respectively formed using the pixels projected onto the 3D space and two adjacent pixels.

19. An apparatus removing redundant data of a simple texture model, the apparatus comprising:

a normal vector calculating unit, which calculates normal vectors of pixels projected onto a three-dimensional (3D) space by using depth images among a plurality of simple texture images that render different aspects of a 3D model;

a reliability calculating unit, which calculates reliabilities of the pixels of each of the simple texture images by using the calculated normal vectors obtained by the normal vector calculating unit; and a redundant data removing unit, which compares the reliabilities of the pixels originating from different simple texture images but rendering the same portion of the 3D model and removes the pixels having low reliabilities from the different simple texture images from which they respectively originate, wherein the normal vector calculating unit calculates the normal vectors of the pixels of each of the simple texture images by projecting the pixels of each of the simple texture images onto the 3D space based on the values of the pixels of each of the depth images and detecting the pixels adjacent to each of the pixels projected onto the 3D space, forming triangular planes using the pixels projected onto the 3D space and two adjacent pixels, calculating normal vectors of the triangular planes, and averaging the normal vectors of the triangular planes.

20. The apparatus of claim 17, wherein the reliability calculating unit calculates the reliabilities of the pixels of each of the simple texture images using the normal vectors of the pixels of each of the simple texture images and a vector perpendicular to a plane of vision of a camera used for creating the simple texture images.

21. An apparatus removing redundant data of a simple texture model, the apparatus comprising:

a normal vector calculating unit, which calculates normal vectors of pixels projected onto a three-dimensional (3D) space by using depth images among a plurality of simple texture images that render different aspects of a 3D model;

a reliability calculating unit, which calculates reliabilities of the pixels of each of the simple texture images by using the calculated normal vectors obtained by the normal vector calculating unit; and a redundant data removing unit, which compares the reliabilities of the pixels originating from different simple texture images but rendering the same portion of the 3D model and removes the pixels having low reliabilities from the different simple texture images from which they respectively originate, wherein the reliability calculating unit determines the reliabilities of the pixels of each of the simple texture images depending on inner products of the normal vectors of the pixels of each of the simple texture images and a vector perpendicular to a plane of vision of a camera used for creating the simple texture images.

22. The apparatus of claim 17 further comprising a proximity calculating unit, which calculates proximities of the pixels of each of the simple textures to one another in the 3D space and determines the pixels located a predetermined critical distance or less apart from one another as rendering the same portion of the 3D model.

23. The apparatus of claim 17, wherein the redundant data removing unit removes all the pixels that render the same portion of the 3D model but originate from different simple texture images, except for one having the highest reliability, from the different simple texture images from which all the pixels respectively originate.

24. An apparatus removing redundant data of a simple texture model, the apparatus comprising:
a normal vector calculating unit, which calculates normal vectors of pixels projected onto a three-dimensional (3D) space by using depth images among a plurality of simple texture images that render different aspects of a 3D model;
a reliability calculating unit, which calculates reliabilities of the pixels of each of the simple texture images by using the calculated normal vectors obtained by the normal vector calculating unit; and
a redundant data removing unit, which compares the reliabilities of the pixels originating from different simple texture images but rendering the same portion of the 3D model and removes the pixels having low reliabilities from the different simple texture images from which they respectively originate,
wherein the redundant data removing unit sets the pixels of each of the depth images having low reliabilities as the pixels of a background image.

25. The method of claim 1, wherein the depth images include information on the simple texture model and information of a camera used for creating the simple texture model.

26. The computer-readable medium of claim 9, wherein the depth images includes information on the simple texture model and information of a camera used for creating the simple texture model.

27. A method of generating a 3D model having a simple texture model, comprising:
removing redundant data of the simple texture model that generates a same portion of the 3D model of an object from different viewpoints by comparing an inner product of a vector normal to the portion of the 3D model in a reference image and a vector normal to a camera angle of the reference image to define the portion of the 3D model in the reference image as redundant data.

* * * * *